Patented May 8, 1934

1,957,988

UNITED STATES PATENT OFFICE 1,957,988

PRODUCTION OF DIPHENYL SUBSTANCES

Eduard Tschunkur, Cologne-Mulheim, and Wilhelm Klein, Leverkusen I. G. Werk, Germany, assignors to I. G. Farbenindustrie Aktiengesellschaft, Frankfort-on-the-Main, Germany No Drawing. Application August 24, 1933, Serial No. 686,648. In Germany May 8, 1931

4 Claims. (Cl. 260—168)

The present invention relates to the catalytic production of diphenyl substances, that is of diphenyl and its homologues, from hydrocarbons of the benzene series, such as benzene, toluene, xylene, ethyl benzene, propyl benzene and mixtures of such hydrocarbons.

Diphenyl and its homologues have been previously prepared by subjecting the said hydrocarbons of the benzene series to a pyrogenetic reaction at from about 800° to 1000° C. Later on it has been suggested to improve the said reaction by certain catalytic substances as for example pumice, quartz, refractory mineral materials, or reducible oxides of the 4th and 5th group of the periodic system as for example lead oxide or vanadium oxide. The yields obtainable with the aid of the said catalytic substances are, however, unsatisfactory. On the other hand it has been suggested to pass vapors of hydrocarbons of the benzene series through pipes made from copper and heated to high temperatures. In this process rather satisfactory yields are obtained, but the said pipes are quickly destroyed.

We have now found that very good yields of the said diphenyl substances can be obtained by passing vapors of hydrocarbons of the benzene series over catalysts from neutral silicates of the earth metals, that is of aluminium and magnesium. Catalysts of the said nature can be prepared for example by combining the weakly acid reacting silicon dioxide with the weakly basic oxides of aluminium or magnesium, so that neutral reacting silicates which are free from alkali metal compounds are obtained. Instead of synthetically preparing the said silicates, compounds or minerals corresponding to the above requirements may be employed as for example a kaolin free from feldspar, that is an aluminium silicate free from alkali metal compounds.

The said catalysts allow working at comparatively low temperatures as for example at from about 700° to 850° C. and possess a very long working life, are very cheap and most economic as they furnish very high yields of diphenyl, calculated on the initial hydrocarbon material consumed, and very low quantities of by-products only. This is proved by the very low hydrogen value of 1.3% obtainable with the aid of the said catalysts which almost corresponds to the theoretically possible value of 1.28%. By the term hydrogen value we mean the weight of the hydrogen set free during the dehydrogenation process calculated on the percentage of initial hydrocarbon consumed. If the hydrogen evolved which is saturated with vapors of the initial hydrocarbons is recovered by the absorption of the benzene hydrocarbons with the aid of absorptive material, as for example absorptive carbon, the yield of valuable products is almost quantitative.

The diphenyl substances formed are recovered from the vaporous reaction mixtures in any known and convenient manner as for example by fractional distillation. The small residue obtained in such distillation consists mainly of diphenyl-benzene and its homologues, the quantity of which may be up to 50% of the residue. 1.3-diphenyl benzene (isodiphenyl benzene having a melting point of 85° C. and a boiling point of 363° C.) and 1.4-diphenyl benzene (having a melting point of 212° C. corr. and a boiling point of 383° C.) can be isolated from the residue in about equal portions, the 1.3-diphenyl benzene being extracted from the residue with the aid of ethyl alcohol from which it crystallizes in the form of needles. The remaining 1.4-diphenyl benzene is preferably recrystallized from toluene.

The dehydrogenation of the hydrocarbons of the benzene series with the aid of the aforesaid catalysts is preferably carried out in copper pipes in order to suppress the formation of carbon. The danger of the pipes becoming clogged is thus removed, so that the diphenyl substances may be continuously prepared, the initial hydrocarbon materials which are not consumed being continuously returned to the reaction space. If the copper pipes are heated with the aid of gas they are preferably covered with nickel steel or chromium-nickel steel or other heat resistant material. Pipes having a mantle of the said kind possess a very long working life.

The danger of the pipes becoming clogged by the deposition of carbon may also be reduced by homogeneously coating the internal surface of the reaction space with the aforesaid catalysts. In this case the pipes or other suitable vessels may consist of iron, nickel, chromium-nickel steel or other metal, stable against the temperature of working, in which, otherwise, a strong deposition of carbon on the metallic surfaces would occur.

The following example will further illustrate the nature of the present invention by comparison of the efficiency of the catalysts employed with that obtainable with catalysts consisting of pumice and refractory mineral material, but the invention is not restricted thereto.

In the last column of the following tables in each case the figures given in the upper line means the amount of benzene consumed, which was lost in the form of low-boiling unsaturated hydrocarbons, and the figures given in the lower line mean the amount of benzene which was lost in the form of hydrogen.

*Yield calculated on benzene consumed*

| Catalyst | Reaction temperature | Of diphenyl | Of residue | Loss in dehydrogenation |
|---|---|---|---|---|
| Pumice | About 750°C | 58.5% | 14.2 | 24.4% 3% $H_2$ |

(The pumice becomes inactive after short use and the yield of diphenyl decreases to about ½ after two days working.)

| Catalyst | Reaction temperature | Of diphenyl | Of residue | Loss in dehydrogenation |
|---|---|---|---|---|
| Lumps of refractory chamotte. A second test in the same manner yielded. | About 750° | 25.7% 20% | Practically zero. ---do------ | 70.3% 4% $H_2$ 76% 4% $H_2$ |

*Yield calculated on benzene consumed*

| Catalyst | Reaction temperature | Of diphenyl | Of residue | Loss in dehydrogenation |
|---|---|---|---|---|
| Sherds of unglazed clay. | About 740° | 89.3% Theoretical yield= 90.3% | 4.2% | 5.2% 1.3% $H_2$ |

In a complete dehydrogenation 2.02 grams of hydrogen are set free from 156.2 grams of benzene, that is 1.28% calculated on the benzene consumed. In the above processes 100 cubic meters of benzene vapors have been passed per hour through a reaction space containing 120 liters of catalyst.

We claim:—

1. In the catalytic production of diphenyl substances from hydrocarbons of the benzene series the step which comprises employing a catalyst essentially comprising a neutral silicate free from alkali metal compounds and selected from the group consisting of aluminum and magnesium silicates.

2. In the catalytic production of diphenyl substances from hydrocarbons of the benzene series the step which comprises employing a catalyst essentially comprising a neutral aluminum silicate free from alkali metal compounds.

3. In the catalytic production of diphenyl substances from hydrocarbons of the benzene series the step which comprises employing a catalyst essentially comprising an aluminum silicate mineral free from feldspar and from alkali metal compounds.

4. The process for the production of diphenyl which comprises passing vapors of benzene at about 750° C. through a reaction space having a copper surface and containing a neutral reacting silicate selected from the group consisting of magnesium and aluminum silicates free from alkali metal compounds.

EDUARD TSCHUNKUR.
WILHELM KLEIN.